(12) United States Patent
Blum Shem-Tov et al.

(10) Patent No.: US 12,519,752 B2
(45) Date of Patent: Jan. 6, 2026

(54) METHOD, SYSTEM AND APPARATUS FOR INLINE DECRYPTION ANALYSIS AND DETECTION

(71) Applicant: Intel Corporation, Santa Clara, CA (US)

(72) Inventors: Ilil Blum Shem-Tov, Kiryat Tivon (IL); Lev Faerman, Ramat Gan (IL); Dan Horovitz, Rishon LeZion (IL); Christine Severns-Williams, Deephaven, MN (US)

(73) Assignee: Intel Corporation, Santa Clara, CA (US)

( * ) Notice: Subject to any disclaimer, the term of this patent is extended or adjusted under 35 U.S.C. 154(b) by 203 days.

(21) Appl. No.: 17/706,498

(22) Filed: Mar. 28, 2022

(65) Prior Publication Data
US 2022/0231991 A1    Jul. 21, 2022

(51) Int. Cl.
   *H04L 9/40*    (2022.01)
(52) U.S. Cl.
   CPC ...... *H04L 63/0254* (2013.01); *H04L 63/0263* (2013.01); *H04L 63/0435* (2013.01); *H04L 63/20* (2013.01)
(58) Field of Classification Search
   CPC ....... H04L 63/0428–0457; H04L 63/12; H04L 63/123; H04L 63/14; H04L 63/1408; H04L 63/1425; H04L 63/16–166; H04L 63/20
   See application file for complete search history.

(56) References Cited

U.S. PATENT DOCUMENTS

| | | | | |
|---|---|---|---|---|
| 7,093,288 B1* | 8/2006 | Hydrie | ............... | H04L 63/0263 709/227 |
| 9,525,671 B1* | 12/2016 | Worsley | ............. | H04L 63/0236 |
| 9,674,090 B2* | 6/2017 | Caulfield | .............. | H04L 47/122 |
| 11,477,125 B2* | 10/2022 | Browne | .............. | H04L 47/2441 |
| 2003/0126468 A1* | 7/2003 | Markham | ............ | H04L 63/164 726/13 |
| 2015/0381459 A1* | 12/2015 | Xiao | ..................... | H04L 45/125 370/253 |
| 2016/0094650 A1* | 3/2016 | Garcia De Rio | ....... | H04L 47/78 709/226 |

(Continued)

OTHER PUBLICATIONS

ASIC—definition by BAE Systems (Year: 2021).*

(Continued)

*Primary Examiner* — Boris D Grijalva Lobos
(74) *Attorney, Agent, or Firm* — Hanley, Flight & Zimmerman, LLC

(57) ABSTRACT

The disclosure generally relates method, system and apparatus to expedite processing of packet data through a network endpoint. In one embodiment, the disclosure relates to an Inline Security Engine (ISE) which may be deployed at network's edge, for example, at a network interface card or a network adaptor. The exemplary ISE may be configured to receive and analyze packets traversing through the endpoint device for compliance with the encryption protocols and other network requirements. Additionally, the ISE may implement steps to increase security of the data if the analysis suggests that the encryption may be weak or faulty or if certain predefined security rules are violated. All processes are implemented inline and at line speed without diminishing the data rate.

25 Claims, 8 Drawing Sheets

(56) References Cited

U.S. PATENT DOCUMENTS

| | | | |
|---|---|---|---|
| 2017/0180272 A1* | 6/2017 | Bernath | H04L 49/90 |
| 2017/0214612 A1* | 7/2017 | Leitner | H04L 49/9036 |
| 2018/0124085 A1* | 5/2018 | Frayman | H04L 63/20 |
| 2019/0190892 A1* | 6/2019 | Menachem | G06F 21/602 |
| 2020/0127861 A1* | 4/2020 | Doshi | G06F 9/544 |
| 2020/0389433 A1* | 12/2020 | Zivic | G06F 9/45558 |
| 2024/0039860 A1* | 2/2024 | Arvind | H04L 47/29 |

OTHER PUBLICATIONS

Google, "Percentage of HTTPS browsing time in Chrome by country/region," Online, HTTPS encryption on the web—Google Transparency Report. Available: https://transparencyreport.google.com/https/overview?hl=en&time_os_region=chrome-usage:1;series:time;groupby:os&lu=load_os_region&load_os_region=chrome-usage:1;series:page-load;groupby:os., retrieved on Jun. 5, 2025, 4 pages.

Chetlall, "YES! Encrypted Traffic Can (and Must) Be Classified," Blog, ENEA, Insights, dated Nov. 25, 2019, 12 pages.

Wikipedia, "Deep packet inspection," Online, Available: https://en.wikipedia.org/wiki/Deep_packet_inspection, retrieved on Jun. 5, 2025, 16 pages.

Kane, "Encrypted Traffic Analysis Will Be Mandatory Soon," Article, Security Boulevard, dated Jan. 10, 2020, 6 pages.

Zhou et al., "Practical evaluation of encrypted traffic classification based on a combined method of entropy estimation and neural networks," Article, ETRI Journal, accepted Oct. 1, 2019, 13 pages.

Dimou et al., "Encrypted Traffic Analysis Use Cases & Security Challenges," Article, ENISA, dated Nov. 2019, 55 pages.

Dorfinger et al., "Entropy estimation for real-time encrypted traffic identification," Paper, Salzburg Research, Traffic monitoring and analysis, Lecture Notes in Computer Science, vol. 6613, 2011, 8 pages.

* cited by examiner

METHOD, SYSTEM AND APPARATUS FOR INLINE DECRYPTION ANALYSIS AND DETECTION

FIELD

The instant disclosure generally relates to method, system and apparatus for inline analysis and detection. The detection and analysis may be implemented on decrypted data. In one embodiment, the disclosure provides method, system and apparatus to expedite processing of decrypted data through a network endpoint. The disclosed embodiments provide for inline analysis and detection of data encryption irregularity at hardware and at line speed.

BACKGROUND

The amount of encrypted traffic through the networks continues to rise. Encrypted traffic through Hypertext Transfer Protocol Secure (HTTPS) is estimated at around 90% of the communicated data. There are encryption trends both to strengthen privacy and security (80% of enterprise web traffic is encrypted and 69% of public clouds) and to conceal malicious activity. Encrypted traffic classification has a crucial role in cybersecurity for several purposes including the detection of insecure traffic and malware. The challenge of encrypted traffic analysis using deep packet inspection (DPI) in firewall appliances often introduces unacceptable network bottlenecks and performance degradation. While some firewalls do claim to perform DPI on HTTPS (encrypted) traffic, the process of analyzing data and inspecting it in-line with the traffic flow is a processor-intensive activity that overwhelms many hardware-based security devices.

Transport Layer Security Protocol (TLS) encryption detection techniques have also been used to detect malware and unsecure traffic. Relying on only TLS inspection, for example, will leave the organizations blind to threats using non-standard encryption. Entropy analysis requires high computational power and needs numerous datasamples to be successful. Further, the conventional solutions do not utilize the capabilities of the endpoints and do not provide an immediate solution to edge deployments where a firewall is not present on the network path. Since the activity takes place when the traffic is already encrypted (for example, at the firewalls), there is a need to inspect traffic before it is encrypted at the point of origin or after it is decrypted at the destination. The software techniques that enable conventional endpoints detection and analysis consume system resources and are also susceptible to compromise if the Operating Software (OS) is infected.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
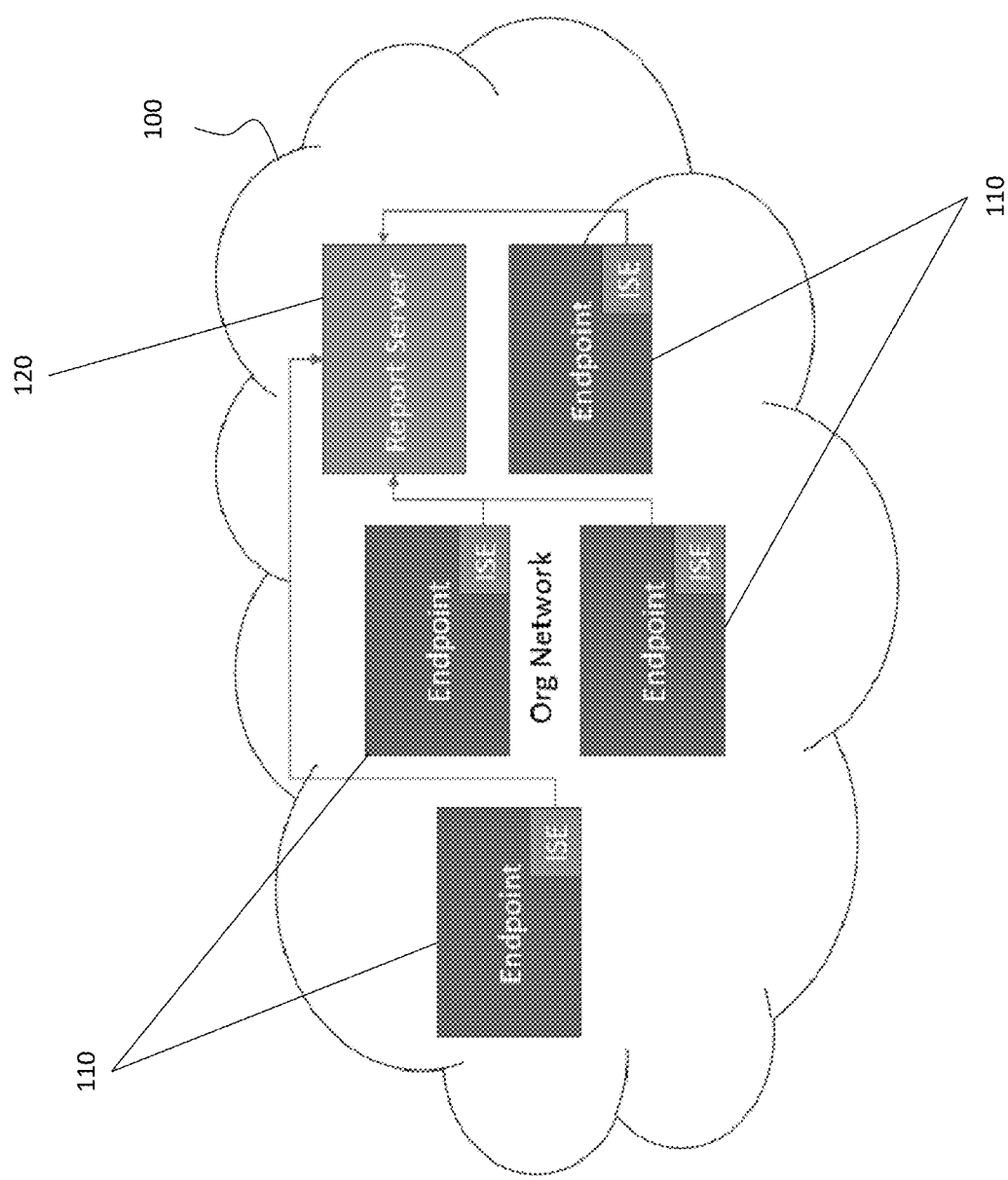
FIG. 1 is a schematic representation of an exemplary network according to one embodiment of the disclosure.

In the following description, numerous specific details are set forth in order to provide a thorough understanding of various embodiments. However, various embodiments may be practiced without the specific details. In other instances, well known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

Deep packet inspection (DPI) is a form of packet filtering which is conventionally carried out as a firewall function. DPI evaluates a packet's header and its data which are transmitted through an inspection point. DPI then separates any protocol non-compliant packets, spam, viruses or intrusions (and any other defined criteria) to block the packet from passing through the inspection point. DPI techniques has been shown to be inefficient and insufficient at detecting non-compliance. For example, studies have shown that enabling DPI in a firewall causes network bottlenecks and performance degradation. While DPI may be combined with other filtering system the combination still proves slow thereby leading to various data traffic bottlenecks.

In one embodiment, the disclosure provides enhancing a network interface card (NIC) (interchangeably, network adapter) with hardware configured to conduct inline decryption analysis of raw data and decrypted data. Raw data may be generated at the host platform (e.g., outbound data generated from a network laptop). Decrypted data may comprise incoming data that is decrypted but not yet communicated to the host platform.

An exemplary hardware component may comprise an Inline Security Engine (ISE) configured to conduct the inline analysis and detection. A cryptographic offload engine such as a cryptographic accelerator may receive the ISE output and encrypt the output (at hardware) prior to allowing the data to be transmitted from the host platform.

Weak encryption detection protects poorly protected data from leaving the network endpoint(s). The weakly encrypted data may include data encrypted with outdated encryption protocol or algorithm. Weakly encrypted data may also comprise data encrypted with poor cryptographic practices (e.g., data encrypted with misconfigured of protocols).

In another embodiment, the disclosure provides one or more NICs or network adapters (wired or wireless and implemented across the broad spectrum of networking use cases). The network adapters may be placed at network endpoints or at the network's edge. Each network adapter may be configured with a cryptographic offload engine. In addition, the network adapter may include an in-line decryption analysis and detection hardware component to implement one or more of the following capabilities:

1. Detect weak encryption data to stop poorly protected data from leaving the endpoint Poorly protected data may include data that encrypted with outdated encryption protocols/algorithms or data encrypted with poor cryptographic practices (e.g., data protected with misconfigured protocols).
2. Detect encrypted data that was not encrypted nor decrypted by the NIC encryption engine. In one embodiment, such traffic shall be treated as suspicious, which can be beneficial in tightly controlled environments such as enterprise laptop distribution or at highly sensitive and secure networks. The NIC may serve as a foothold for the larger system as it is a much smaller than the host platform, it has a smaller attack surface in comparison to the host platform and can be specifically designed to be a small-scale hardened entity.

In one implementation, the offload engine (may be formed along with the cryptographic accelerator on the same SoC) may include a two-step entropy analysis to distinguish the encrypted traffic from the non-encrypted data traffic, including: (1) Analysis and classification for anomalous traffic detection for non-encrypted traffic; and (2) Encrypted traffic analysis and classification.

The disclosed embodiments are particularly advantageous over the conventional methods. For example, the disclosed embodiments provide a distributed hardware firewall which provides the network endpoints with inline security capabilities. As disclosed herein, a network endpoint may be any system terminating the network connection such as laptops, workstations, servers, IoT devices, autonomous vehicles, etc. In one exemplary embodiment, the endpoint may be any device with a NIC (which according to certain embodiments is fortified with inline security capabilities). The endpoints may then be available even in edge/client/IoT/server deployments and due to their hardware nature easier to secure than software-based solutions. In addition, hardware offloads can perform these operations with significantly lower performance impact as compared with software platforms. The embedded nature of the solution has a smaller attack surface, which would make it harder to compromise.

FIG. 1 is a schematic representation of an exemplary network according to one embodiment of the disclosure. Specifically, FIG. 1 illustrate a plurality of network devices, each equipped with an Inline Security Engine (ISE) protected with the report server option enabled. Network 100 may define a corporate, an organizational or a government network. Network endpoints 110 may comprise network devices smart phones, laptops, tablets, printers, IOT devices, etc.). Network 100 also comprises Report Server 120. Report Server 120 may comprise a server-based report generating software system, for example, an SQL Server, to provide a network interface with the endpoints.

It is noted that while the exemplary embodiment of FIG. 1 illustrates the endpoints 110 as having an independent ISE, the disclosed embodiments are not limited thereto and one or more of endpoints 110 may exclude an Each endpoint includes a NIC (not shown). Each NIC may comprise an embedded ISE. As will be discussed further below, an ISE may comprise hardware, software or a combination of hardware and software to implement inline security detection and analysis. The ISE may be implemented in a System on Chip (SoC).

The ISE may comprise inline security components which allow network 100 to push out firewall and other security capabilities to the network edge by embedding them into the NICs which make endpoints a part of the network while removing them from the host system itself. As a result, network 100 defines a more robust system such that even a compromised Operating Software (OS) cannot affect the ISE in the NIC without additional level of compromising. Other system advantages include:

1. Protection of corporate assets such as such as employee laptops and desktops from ransomware trying to exfiltrate data, or employees tying to exfiltrate corporate secrets. The result of the analysis detection will be sent to Report Server 120.
2. Highly sensitive networks can mandate requiring each NIC (not shown) to see traditionally un-scrutinized traffic while still maintaining security of the traffic across the network link.
3. A governmental entity may require such capability to be embedded into every device sold within its jurisdiction to provide an equivalent of a local lawful intercept capability in every device.
4. The ISE capabilities will be agentless on the host system and will reduce the performance impact when compared to the software solution.

Whereas the conventional techniques were centralized in that they investigated encrypted data at the network gateways, the disclosed embodiments provide a decentralized and distributed network that that distribute the processing requirements or load throughout the network. The conventional techniques created processing bottlenecks at network gateways which is removed by the disclosed embodiments.

In one embodiment of the disclosure, the NIC may comprise a cryptographic accelerator along with or as part of the ISE. The programmable accelerator may comprise programmable components and circuitry for efficient data processing by making fast decisions on processing technique and data routing. The cryptographic accelerator may be implemented in hardware.

In another embodiment, the NIC may have an encryption offloading engine to offload processing of certain data (e.g., TLS) to the network controller. In such embodiments, the ISE may focus on data traffic that is not offloaded. In this regard, it should be noted that that traffic may be offloaded to the encryption engine when it is encrypted in that engine. Traffic which is not offloaded is the traffic where the host does not ask the encryption engine to provide encryption/decryption services.

In one embodiment, the ISE can perform inline analysis of traffic traversing through the NIC of each endpoint. The inline analysis may be implemented at line speed so as not to slow the transmission rate. The inline analysis may be designed to identify improper data or encryption irregularities. The inline analysis can be at line rate, in real-time and with packet-level granularity (i.e., per-packet).

The per-packet analysis may include identifying whether the packet is encrypted, and if encrypted, whether the encryption is weak or outdated. In one embodiment, the analysis may include determination of the entropy state of the data stream. In still another embodiment, the ISE may be used to detect and enforce organizational rules or network administrative rules that are not followed.

After the analysis step, the ISE may take certain actions as a function of previously defined rules. The steps may include, for example, allowing passage of the packet, rejecting the packet and/or reporting the results (e.g., Report Server 120) of the analysis. In one embodiment, the unencrypted or poorly encrypted data may be encrypted by the ISE hardware. The data that is analyzed and approved by the ISE may be then routed according to the date header.

Figure 2:
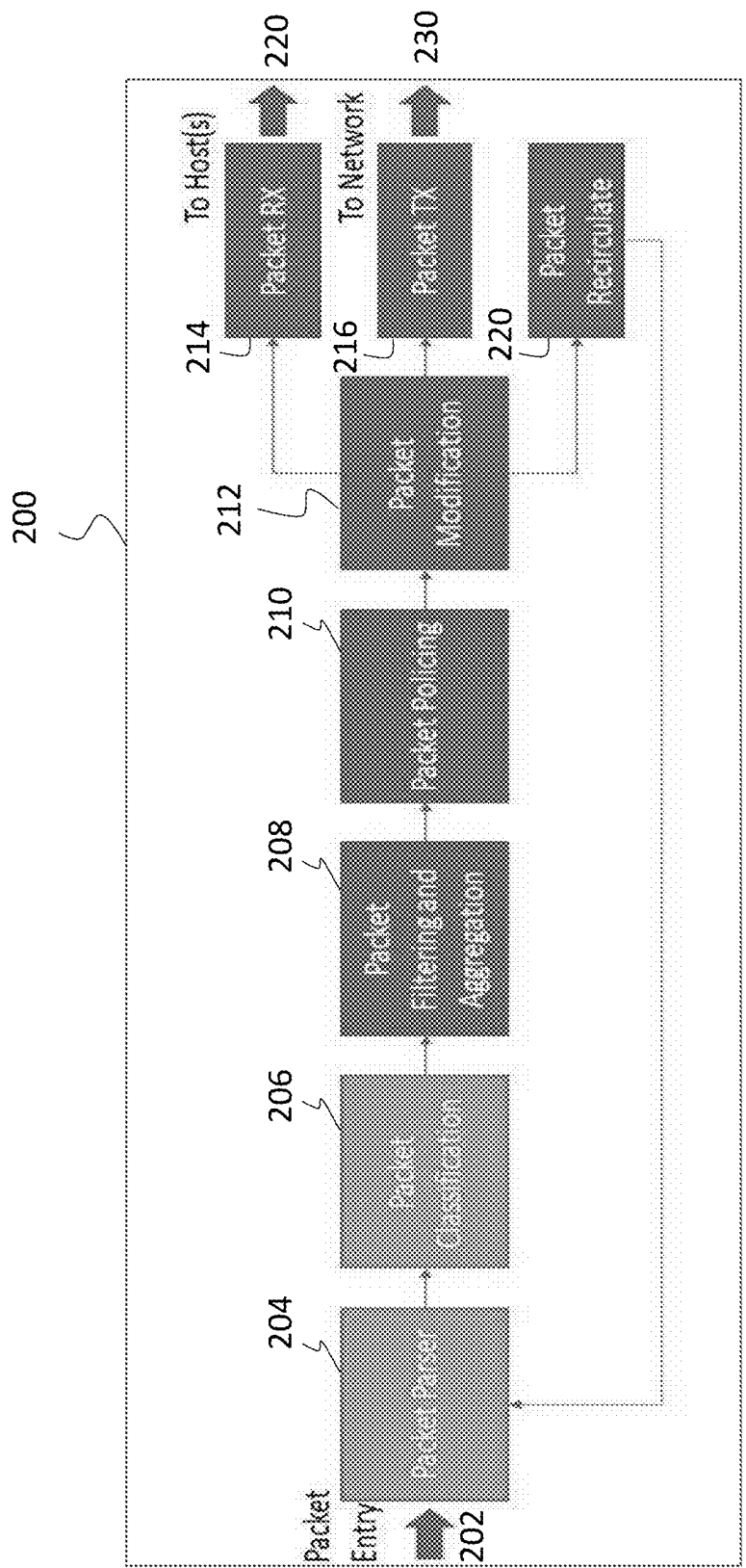
FIG. 2 illustrates a generalized traffic pipeline through a network interface card.

The conventional network adapters process packets through a packet pipeline which is used to classify and direct data traffic. FIG. 2 illustrates a generalized pipeline of traffic through a network interface card. Each of the steps shown in FIG. 2 may be performed by one or more dedicated circuitries. The generalized pipeline of FIG. 2 illustrates the actions taken on a packet as it travels through the NIC. Such pipelines may be split between transmitter (Tx) and receiver (Rx) or may process traffic from both directions simultaneously. The pipeline may allow recirculation of packets through itself to provide services such as tunnel encapsulation and decapsulation.

At step 204 of FIG. 2, the metadata of the raw packet is examined to determine the type of the packet based on known protocols. At step 206, packets are classified as a function of the metadata from the parser and raw packet fields to classify packets to a specific type and identifying basic routing information. Step 208 is directed to packet filtering and aggregation which relate to making routing decisions and applying actions to data packets, as well as identifying and acting upon packet flows, such as specific connections. Step 210 is directed to packet policing; which relates to applying policing policies to packets and follows. Step 212 is directed to modifying packets based on metadata and content, for example to allow for tunnel encapsulation and decapsulation and/or packet replication. These steps may be implemented at a network interface or a network adapter.

The overall action(s) taken on a packet is the result of the actions of all individual pipeline blocks. The latter action blocks may be configured to override the prior decisions as needed. The result of the process of FIG. 2 is the routing decision. That is, the packet may be routed to a destination on the host itself (e.g., such as virtual machine (VM) or a specific queue) (step 220), sent to the network through one of the device's ports (step 230) or sent for another trip through the pipeline (step 220) for further modification. While not shown, additional processing blocks may be present on all the aforementioned paths.

Figure 3:
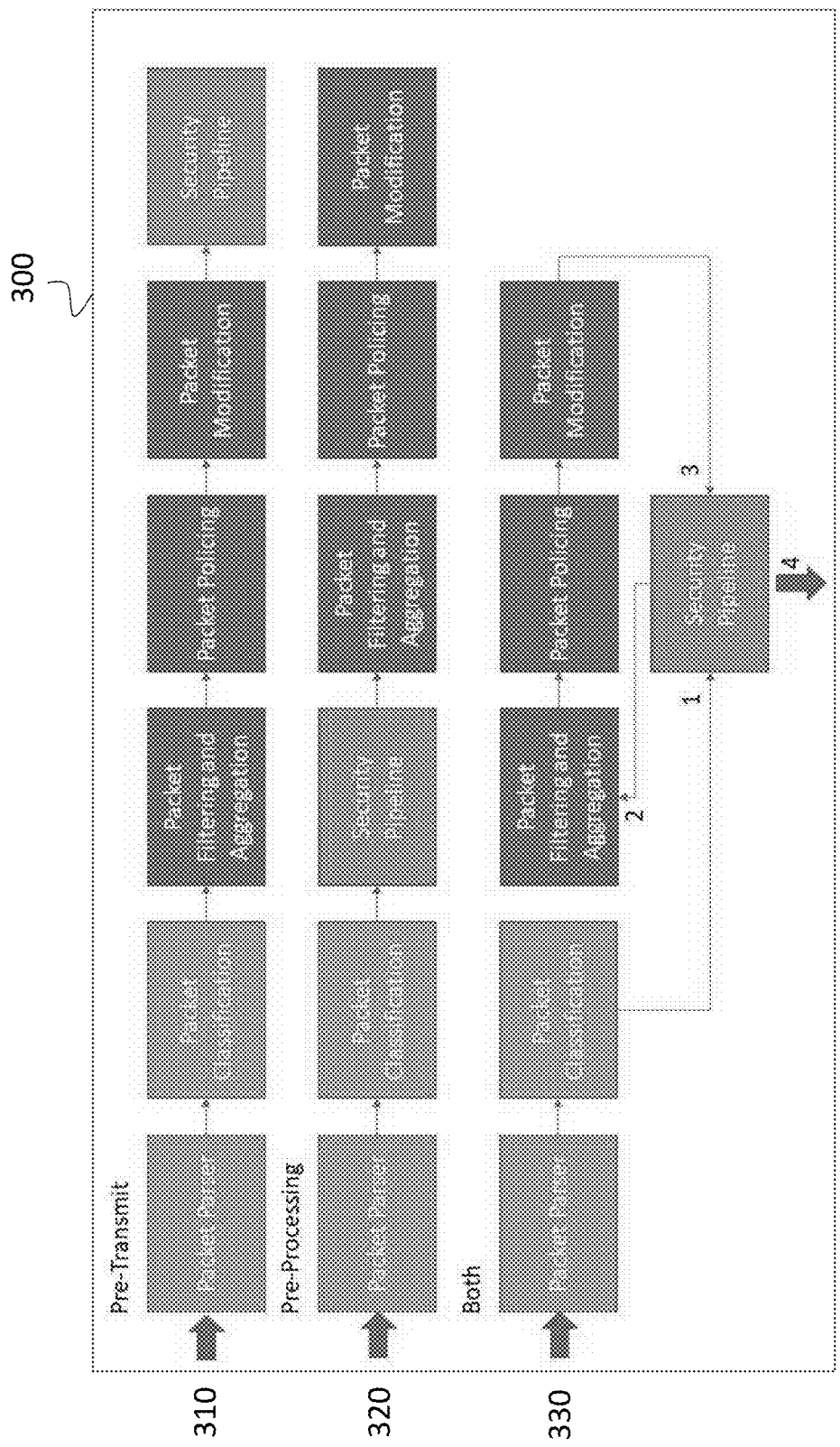
FIG. 3 schematically illustrates an exemplary implementation of the Inline Security Pipeline at different locations according to perceived threat model.

FIG. 3 schematically illustrates an exemplary implementation of the Inline Security Pipeline at different locations according to perceived threat model. The inline security pipeline may be implemented at the ISE as describe above. The schematic of FIG. 3 illustrates the flexibility of placing the security pipeline of the ISE anywhere (or at multiple places) through the packet processing flow.

By way of example, FIG. 3 illustrates three different threat models. In the pre-transmit case, incoming packet traffic arrow 310 is processed through the generalized packet processing pipeline (see FIG. 2) before it is acted upon by the FSE. Here, the security pipeline acts on the final packet after all the packet modification step and before the packet leaves the host (i.e., ISE or NIC). This allows ISE to catch any injections of content possible, for example, any injection done by the modification step. While this step is advantageous in that it acts on the final packet, it may have the disadvantage of missing any irregularity in the original packet (i.e., before it is processed through the generalized pipeline).

In the pre-processing case, the security pipeline acts on the packet before any processing is done. This is illustrated by arrow 320. Here, the incoming data packets are subjected to packet parser and packer classification before acted upon but ISE's security pipeline. This allows security processing on the packets before any latter pipeline actions occur which may mask malicious content. The pre-processing implementation is advantageous over the pre-transmit implementation because in the pre-processing implementation the ISE reviews the original packet and can detect any irregularity therein. However, the pre-processing implementation has the disadvantage of ignoring any changes to the packet as it proceeds though the subsequent processing steps (e.g., the packet after it has been modified).

In the final case, which is illustrated by data traffic arrow 330, the packets travel through the security pipeline twice (which means the pipeline needs to be either duplicated, or capable of twice the throughput) covering both use cases pre-transmit (310) and pre-processing (320). Here, the security pipeline is implemented after the packet classification step (indicated by arrow 1), the result is then fed back (indicated by arrow 2) to the process flow at packet filtering and aggregation step. Once the packets are processed through the packet policing and packet modification steps, the results are once more processed through the security pipeline (indicated by arrow 3) of the ISE to produce the final result (indicated by arrow 4). This use case is advantageous in that the process is thorough and duplicative. However, this use case has the disadvantage of requiring the processor to work twice as fast or provide twice the processing bandwidth. It should be noted that the implementation cases represented in FIG. 3 are exemplary and non-limiting and that various implementation of the security pipeline though the generalized packet processing may be done without departing from the disclosed principles.

Figure 4:
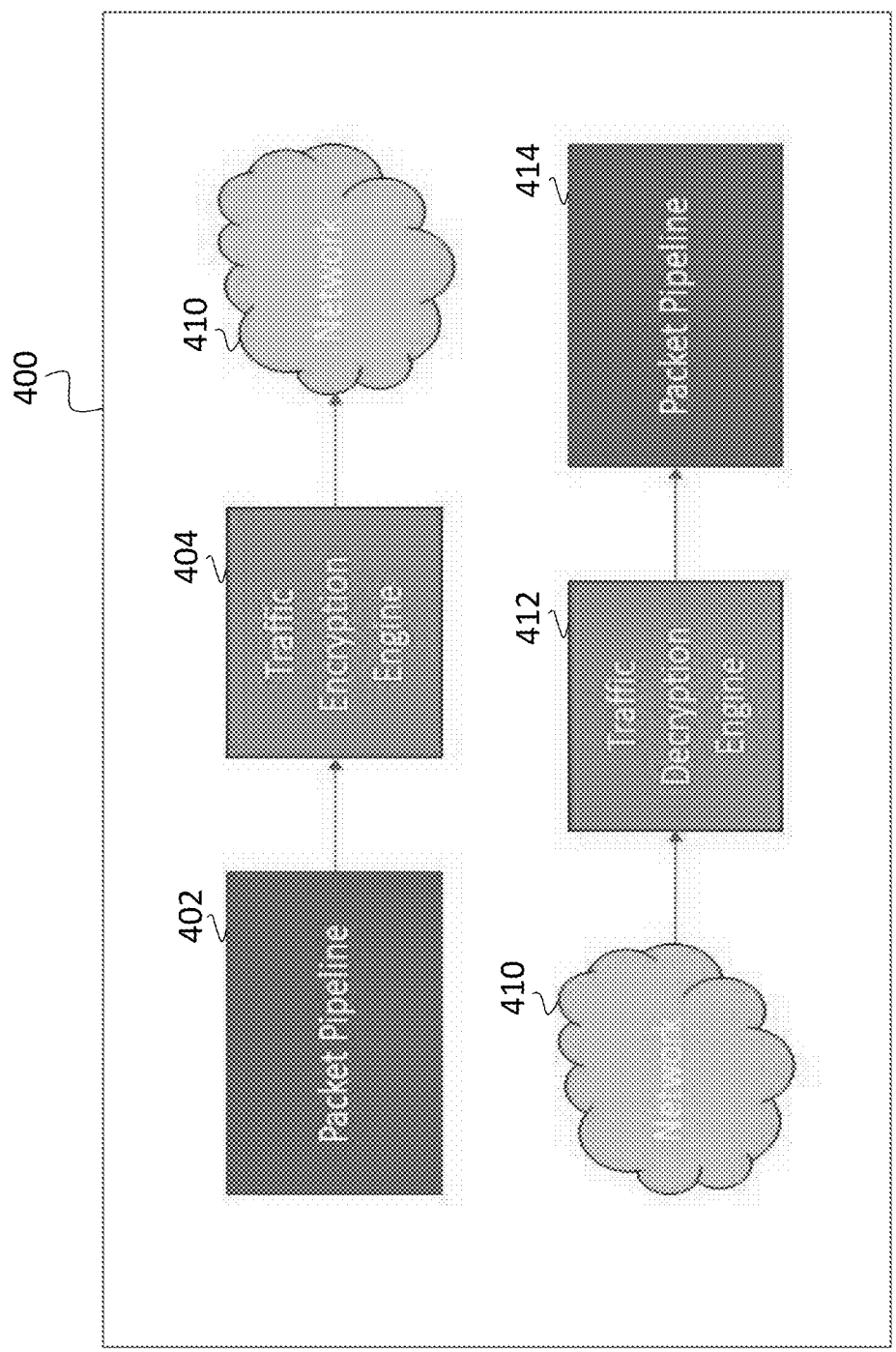
FIG. 4 schematically illustrates the traffic encryption flow through a network adapter (NIC) according to one embodiment of the disclosure.

FIG. 4 schematically illustrates the traffic encryption flow through a network adapter (NIC) according to one embodiment of the disclosure. In FIG. 4 packet pipeline 402 represents the processed packet which may be the output of the ISE processing described in FIG. 3. The packet pipeline is input into traffic encryption engine 404. The traffic encryption engine may comprise a cryptographic accelerator of the NIC. That is, the traffic encryption (or decryption) is done by the cryptographic accelerator.

In one embodiment, the traffic encryption engine 410 denotes a cryptographic accelerator. This device performs cryptographic functions (i.e., encrypt or decrypt traffic data). This provides a unique position to perform data analysis which is not possible in a later hop in transit.

Figure 5:
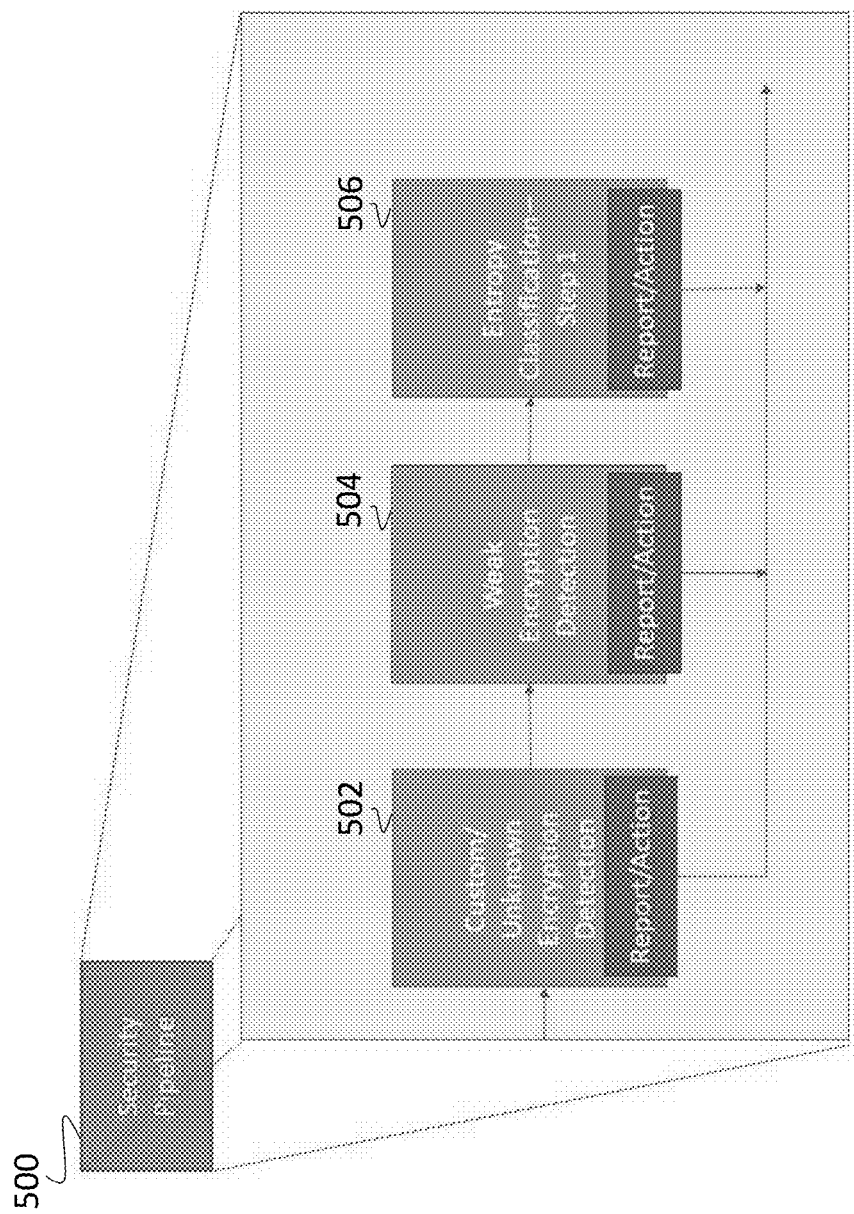
FIG. 5 is a schematic illustration of a security system and pipeline flow according to one embodiment of the disclosure.

FIG. 5 is a schematic illustration of a security system and pipeline flow according to one embodiment of the disclosure. The security pipeline of FIG. 5 may be used for inline decryption analysis and detection. The security pipeline of FIG. 5 may be implemented at the ISE of the NIC as described above to implement analysis and to take the necessary actions discussed in reference to FIGS. 1, 3 and 4. The illustration of FIG. 5 shows an inline implementation in which some of the processes may be performed in parallel. In FIG. 5, security pipeline 500 implements processes 502 (identify custom or unknown encryption/decryption), 503 (detect weak encryption detection) and 506 (entropy classification). The result of each step may be reported, and additional action taken as schematically illustrated in FIG. 5.

Security pipeline 500 may be operated in different modes: automatic mode when all the configurations are done in advance and are non-configurable (rules based on predefined thresholds and custom needs), or in a configurable mode (e.g., white box compatible) by providing customers a programmable API to add their specific changeable thresholds.

To allow encrypted entropy classifier 506, the entropy feature will have to be placed after the encryption engine.

Hence, Entropy Classifier—Step 2 (not shown) is not illustrated as part of the security pipeline 500 located before the encryption engine but after it. Entropy Classifier—Step 1 is for non-encrypted data and is shown as part of security pipeline 500.

The combination of the detecting encrypted traffic which is not entrusted to the NIC for encryption with a cryptographic offload allows the NIC to force endpoints to provide their plaintext traffic for encryption as traffic encrypted by the host itself will be detected and halted if the use case calls for it. This allows the NIC to serve as a firewall-at-the-edge where, if properly configured, the NIC may inspect all traffic leaving and arriving at the endpoint. This is a powerful capability which is not offered by the conventional systems and methods.

Figure 6:
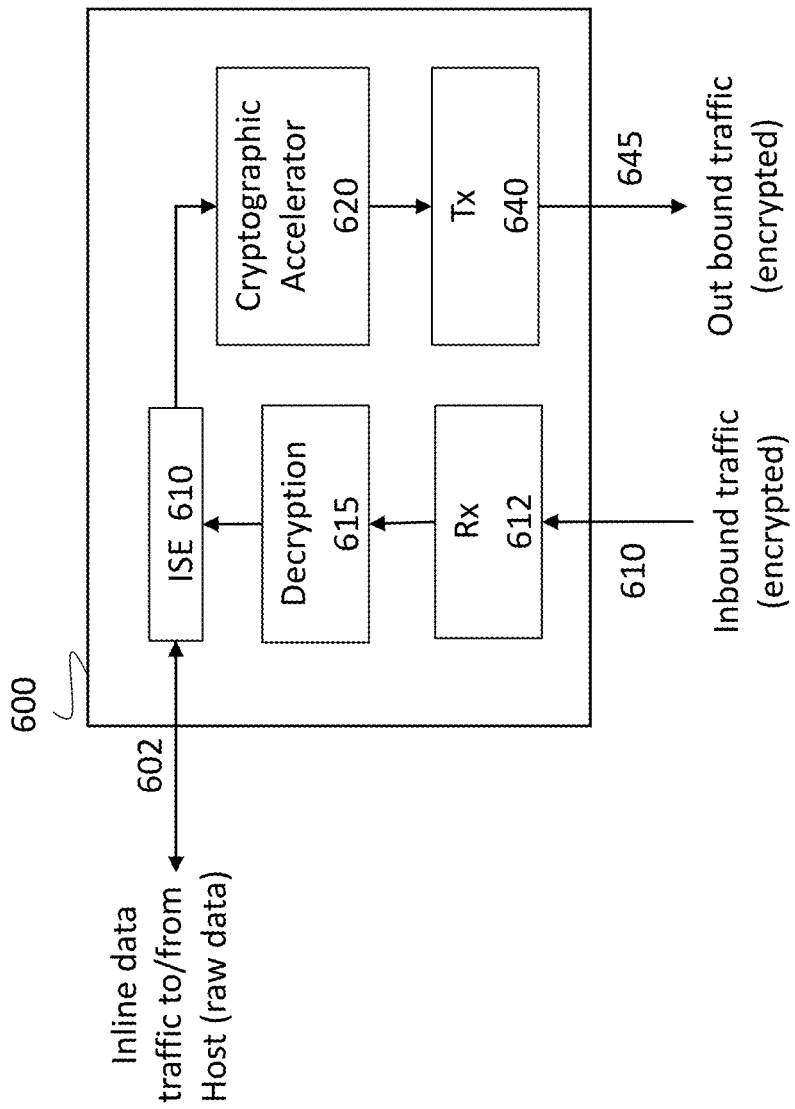
FIG. 6 is a schematic illustration of an exemplary Network Interface Card according to one embodiment of the disclosure.

FIG. 6 is a schematic illustration of an exemplary Network Interface Card according to one embodiment of the disclosure. NIC 600 of FIG. 6 may be implemented at any endpoint device described herein. In FIG. 6, NIC 600 is shown with ISE 610, cryptographic accelerator 620 and transmitter/receiver 630. NIC 600 includes other components and circuitries which are not illustrated here for the sake of simplicity.

NIC 600 is shown to receive data from its internal platform (e.g., laptop) as indicated by arrow 602 may comprise the so-called raw data. While this traffic may be bidirectional, the following discussion focuses on inbound traffic to ISE 610. NIC 600 may also receive encrypted inbound traffic 610 at receiver 612. Receiver 612 may relay data 610 to decryption engine 615 which in turn decrypts and forwards this data to ISE 610. ISE 610 may then analyze and act on the received data packets according to the disclosed embodiments. While not shown, ISE 610 may also communicate with Report Server (see FIG. 1) to report detection results and any action taken on the processed data packets. ISE 610 may examine each received data packet for encryption irregularities described above and take certain actions according to a set of predefined rules. These actions may include discarding a packet (due to irregularity), returning the packet to its transmitter, routing the packet to its destination, or fortifying the encryption of the packet (through cryptographic accelerator 620), etc.

The packet data traffic is then routed to cryptographic accelerator 620 to process data traffic that has been cleared before or after encryption/decryption process. Cryptographic accelerator may also work at line speed and encrypt the outbound packet before transmitting the packet to transmitter 640. Transmitter 640 transmits the packet as encrypted outbound traffic 645.

The ISE and its security pipeline may be implemented at an integrated circuit. The integrated circuit may comprise of, for example, a System-on-Chip (SoC). The SoC may be an existing SoC or it may be added to the NIC. An exemplary ISE may be implemented in software which is executed on the SoC.

Figure 7:
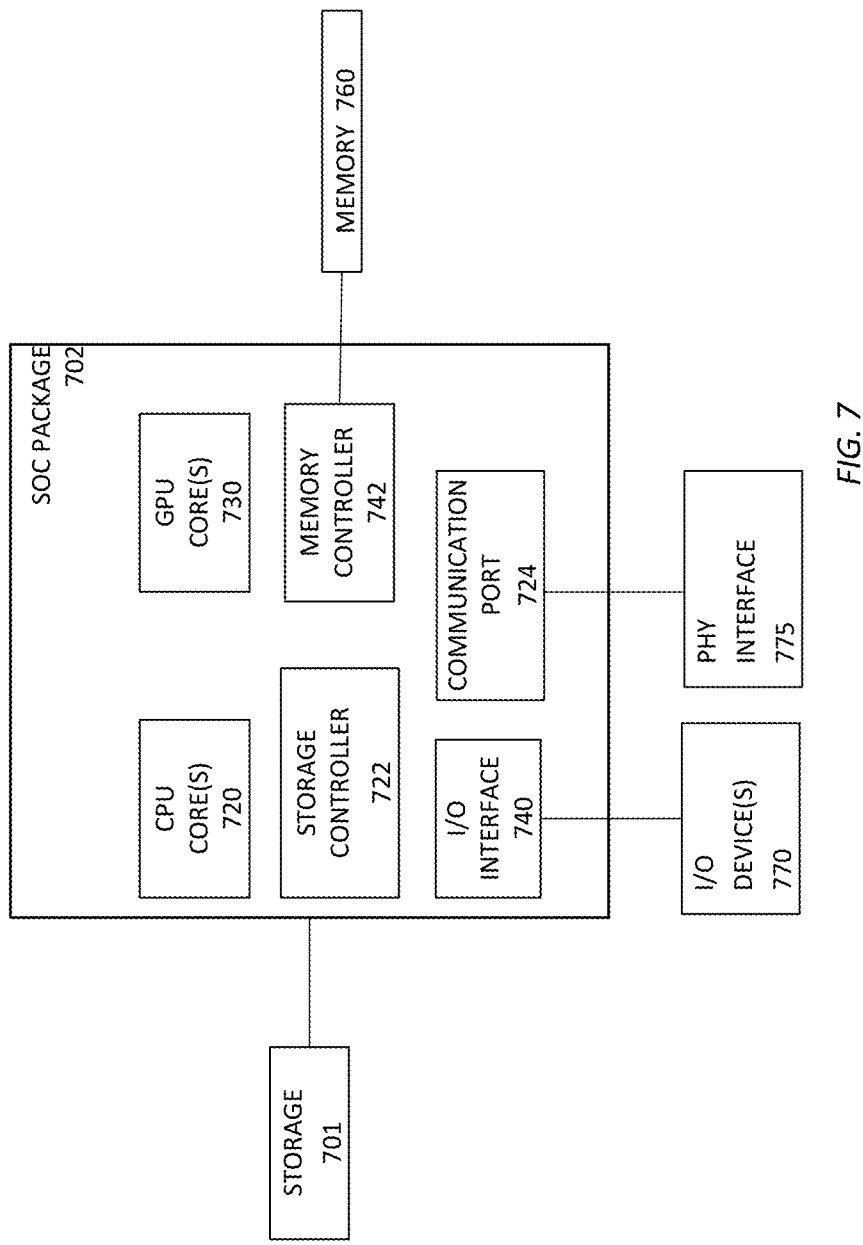
FIG. 7 illustrates a block diagram of a System-On-Chip (SoC) package in accordance with an embodiment.

FIG. 7 illustrates a block diagram of an SoC package for executing the security pipeline in accordance with an embodiment. As illustrated in FIG. 7, SOC 702 includes one or more Central Processing Unit (CPU) cores 720, one or more Graphics Processor Unit (GPU) cores 730, an Input/Output (I/O) interface 740, and a memory controller 742. SOC Package 702 communicates with storage circuitry 701. Storage circuity 7001 may comprise conventional memory for storing instructions. In an exemplary embodiment, storage 701 communicates with storage controller 722 which implement the stored instructions at SOC 702. Various components of the SOC package 702 may be coupled to an interconnect or bus such as discussed herein with reference to the other figures. Also, the SOC package 702 may include more or less components, such as those discussed herein with reference to the other figures. Further, each component of the SOC package 720 may include one or more other components, e.g., as discussed with reference to the other figures herein. In one embodiment, SOC package 702 (and its components) is provided on one or more Integrated Circuit (IC) die, e.g., which are packaged into a single semiconductor device.

As illustrated in FIG. 7, SOC package 702 is coupled to a memory 760 via the memory controller 742. In an embodiment, the memory 760 (or a portion of it) can be integrated on the SOC package 702.

The I/O interface 740 may be coupled to one or more I/O devices 770, e.g., via an interconnect and/or bus such as discussed herein with reference to other figures. I/O device(s) 770 may include one or more of a keyboard, a mouse, a touchpad, a display, an image/video capture device (such as a camera or camcorder/video recorder), a touch screen, a speaker, or the like. Communication port 724 communicates with PHY interface 775 which may define an ethernet port.

Figure 8:
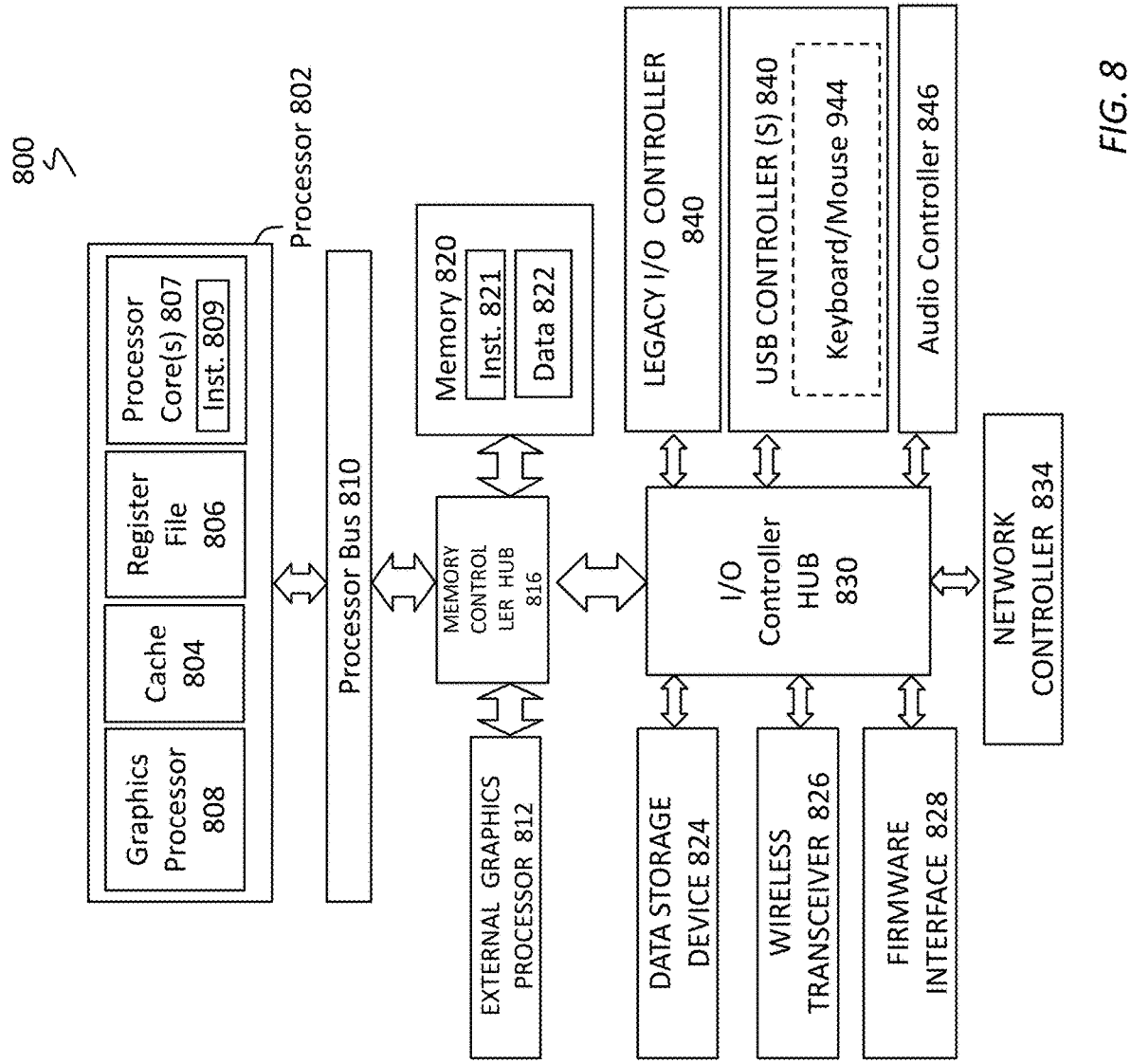
FIG. 8 is a block diagram of a processing system according to an embodiment of the disclosure.

FIG. 8 is a block diagram of a processing system 800, according to an embodiment. In various embodiments the system 800 includes one or more processors 802 and one or more graphics processors 808, and may be a single processor desktop system, a multiprocessor workstation system, or a server system having a large number of processors 802 or processor cores 807. In on embodiment, the system 800 is a processing platform incorporated within a system-on-a-chip (SoC or SOC) integrated circuit for use in mobile, handheld, or embedded devices.

An embodiment of system 800 can include or be incorporated within a server-based gaming platform, a game console, including a game and media console, a mobile gaming console, a handheld game console, or an online game console. In some embodiments system 800 is a mobile phone, smart phone, tablet computing device or mobile Internet device. Data processing system 800 can also include, couple with, or be integrated within a wearable device, such as a smart watch wearable device, smart eyewear device, augmented reality device, or virtual reality device. In some embodiments, data processing system 800 is a television or set top box device having one or more processors 802 and a graphical interface generated by one or more graphics processors 808. In another embodiment, the disclosed embodiments define a server in a data center.

In some embodiments, the one or more processors 802 each include one or more processor cores 807 to process instructions which, when executed, perform operations for system and user software. In some embodiments, each of the one or more processor cores 807 is configured to process a specific instruction set 809. In some embodiments, instruction set 809 may facilitate Complex Instruction Set Computing (CISC), Reduced Instruction Set Computing (RISC), or computing via a Very Long Instruction Word (VLIW). Multiple processor cores 807 may each process a different instruction set 809, which may include instructions to facilitate the emulation of other instruction sets. Processor core 807 may also include other processing devices, such a Digital Signal Processor (DSP).

In some embodiments, the processor 802 includes cache memory 804. Depending on the architecture, the processor 802 can have a single internal cache or multiple levels of internal cache. In some embodiments, the cache memory is shared among various components of the processor 802. In some embodiments, the processor 802 also uses an external cache (e.g., a Level-3 (L3) cache or Last Level Cache (LLC)) (not shown), which may be shared among processor cores 807 using known cache coherency techniques. A register file 806 is additionally included in processor 802 which may include different types of registers for storing different types of data (e.g., integer registers, floating point registers, status registers, and an instruction pointer register). Some registers may be general-purpose registers, while other registers may be specific to the design of the processor 802.

In some embodiments, processor 802 is coupled to a processor bus 810 to transmit communication signals such as address, data, or control signals between processor 802 and other components in system 800. In one embodiment the system 800 uses an exemplary 'hub' system architecture, including a memory controller hub 816 and an Input Output (I/O) controller hub 830. A memory controller hub 816 facilitates communication between a memory device and other components of system 800, while an I/O Controller Hub (ICH) 830 provides connections to I/O devices via a local I/O bus. In one embodiment, the logic of the memory controller hub 816 is integrated within the processor.

Memory device 820 can be a dynamic random-access memory (DRAM) device, a static random-access memory (SRAM) device, flash memory device, phase-change memory device, or some other memory device having suitable performance to serve as process memory. In one embodiment the memory device 820 can operate as system memory for the system 800, to store data 822 and instructions 821 for use when the one or more processors 802 executes an application or process. Memory controller hub 816 also couples with an optional external graphics processor 812, which may communicate with the one or more graphics processors 808 in processors 802 to perform graphics and media operations.

In some embodiments, ICH 830 enables peripherals to connect to memory device 820 and processor 802 via a high-speed I/O bus. The I/O peripherals include, but are not limited to, an audio controller 846, a firmware interface 828, a wireless transceiver 826 (e.g., Wi-Fi, Bluetooth), a data storage device 824 (e.g., hard disk drive, flash memory, etc.), and a legacy I/O controller 840 for coupling legacy (e.g., Personal System 2 (PS/2)) devices to the system. One or more Universal Serial Bus (USB) controllers 842 connect input devices, such as keyboard and mouse 844 combinations. A network controller 834 may also couple to ICH 830. In some embodiments, a high-performance network controller (not shown) couples to processor bus 810. It will be appreciated that the system 800 shown is exemplary and not limiting, as other types of data processing systems that are differently configured may also be used. For example, the I/O controller hub 830 may be integrated within the one or more processor 802, or the memory controller hub 816 and I/O controller hub 830 may be integrated into a discreet external graphics processor, such as the external graphics processor 812.

Example 1 is directed to a system comprising: a processor circuitry; a memory circuitry in communication with the processor circuity, the memory circuitry configured with instructions to cause the processor circuitry to implement packet security tasks including: receive a plurality of unencrypted or decrypted data packets; analyze a first of the plurality of received data packets to detect presence of an encryption irregularity; and determine whether to discard the first data packet, direct the first data packet to a first data packet destination or return the first data packet to a first data packet transmitter; wherein the system is employed at a network endpoint and wherein detection and analysis are implemented at line speed and the encryption irregularity is detected while the packet traverses through a network interface card (NIC).

Example 2 is directed to the system of example 1, wherein the processor circuitry is further configured for inline detection and analysis of incoming data packets.

Example 3 is directed to the system of example 1, wherein the processor circuitry is further configured for inline analysis of the first data packets (i) prior to processing the first data packet through an NIC security pipeline, (ii) after processing the first data packet through the NIC security pipeline, or both.

Example 4 is directed to the system of example 1, further comprising an encryption engine to encrypt the first data packet before the first data packet is directed to the first data packet destination.

Example 5 is directed to the system of example 1, wherein the encryption irregularity comprises encryption with an expired encryption, a weak encryption algorithm or an incorrect encryption protocol.

Example 6 is directed to the system of example 1, wherein the instructions further cause the processor circuitry to detect packet encryption contrary to a network rule.

Example 7 is directed to the system of example 1, wherein the instructions further cause the processor circuitry to analyze a second packet of the plurality of received data packets to detect an encryption irregularity.

Example 8 is directed to the system of example 1, wherein the processor circuitry and the memory circuitry are integrated on a System-on-Chip (SoC).

Example 9 is directed to the system of example 1, wherein the instructions further cause the processor circuitry to report the detected packet irregularity to a report server.

Example 10 is directed to the system of example 1, wherein the system is configured for decryption analysis and detection of incoming data packets.

Example 11 is directed to a non-transitory computer-readable medium comprising a processor circuitry and a memory circuitry in communication with the processor circuitry and including instructions to detect and analyze decrypted data traffic through a network, the memory circuitry further comprising instructions to cause the processor to: receive a plurality of unencrypted or decrypted data packets; analyze a first of the plurality of received data packets to detect presence of an encryption irregularity; and determine whether to discard the first data packet, direct the first data packet to a first data packet destination or return the first data packet to a first data packet transmitter; wherein the system is employed at a network endpoint and wherein detection and analysis are implemented at line speed and the encryption irregularity is detected while the packet traverses through a network interface card (NIC).

Example 12 is directed to the medium of example 11, wherein the instructions further cause the processor circuitry to implement inline analysis of the plurality of data packets.

Example 13 is directed to the medium of example 11, wherein the instructions further cause the processor circuitry to implement inline analysis of the plurality of data packets (i) prior to processing the first data packet through an NIC security pipeline, (ii) after processing the first data packet through the NIC security pipeline, or both.

Example 14 is directed to the medium of example 11, further comprising an encryption engine to encrypt the first data packet before the first data packet is directed to the first data packet destination.

Example 15 is directed to the medium of example 11, wherein the encryption irregularity comprises encryption with an expired encryption, a weak encryption algorithm or an incorrect encryption protocol.

Example 16 is directed to the medium of example 11, wherein the instructions further cause the processor circuitry to detect packet encryption contrary to a network rule.

Example 17 is directed to the medium of example 11, wherein the instructions further cause the processor circuitry to analyze a second packet of the plurality of received data packets to detect an encryption irregularity.

Example 18 is directed to the medium of example 11, wherein the instructions further cause the processor circuitry to report the detected packet irregularity to a report server.

Example 19 is directed to a network adaptor, comprising: an Inline Security Engine (ISE) having a processor circuitry and a memory circuitry, the memory circuitry in communication with the processor circuitry, the memory circuitry configured with instructions to cause the processor circuitry to: receive a plurality of unencrypted or decrypted data packets; analyze a first of the plurality of received data packets to detect presence of an encryption irregularity; and determine whether to discard the first data packet, direct the first data packet to a first data packet destination or return the first data packet to a first data packet transmitter; and a cryptographic accelerator engine to receive the ISE output and encrypt the first data packet prior transmission to the first data packet destination; wherein the system is employed at a network endpoint and wherein detection and analysis are implemented at line speed and the encryption irregularity is detected while the packet traverses through a network interface card (NIC).

Example 20 is directed to the network adaptor of example 19, further comprising a receiver circuit to receive encrypted inbound data packets and a decryption engine to decrypt the inbound data packets.

Example 21 is directed to the network adaptor of example 19, further comprising a transmitter to transmit the first encrypted packet to the first data packet destination.

Example 22 is directed to the network adaptor of example 19, wherein the ISE implements inline analysis of the plurality of data packets.

Example 23 is directed to the network adaptor of example 19, wherein the ISE implements inline analysis of the first data packets (i) prior to processing the first data packet through an NIC security pipeline, (ii) after processing the first data packet through the NIC security pipeline, or both.

Example 24 is directed to the network adaptor of example 19, further comprising an encryption engine to encrypt the first data packet before the first data packet is directed to the first data packet destination.

Example 25 is directed to the network adapter of example 19, wherein the encryption irregularity comprises encryption with an expired encryption, a weak encryption algorithm or an incorrect encryption protocol.

Example 26 is directed to the network adapter of example 19, wherein the ISE detects packet encryption contrary to a network rule.

Example 27 is directed to the network adaptor of example 19, wherein the ISE reports the detected packet irregularity to a report server.

While the principles of the disclosure have been illustrated in relation to the exemplary embodiments shown herein, the principles of the disclosure are not limited thereto and include any modification, variation or permutation thereof.

What is claimed is:

1. A system comprising:
   a processor circuitry;
   a memory circuitry in communication with the processor circuitry, the memory circuitry configured with instructions to cause the processor circuitry to implement packet security tasks including:
   analyze a first data packet of a plurality of data packets to detect presence of an encryption irregularity, the encryption irregularity includes an indication that the first data packet was encrypted by the host platform and not a network interface card (NIC) performing the analysis; and
   determine, based on the analysis, whether to one of (i) discard the first data packet, (ii) direct the first data packet to a first data packet destination, or (iii) return the first data packet to a first data packet transmitter;
   wherein the system is employed at a network endpoint and wherein detection and analysis are implemented at line speed and the encryption irregularity is detected while the packet traverses through NIC and the NIC is to analyze data packets to provide firewall functionality before encrypting the data packets for transmission; and
   wherein the processor circuitry is further configured for inline detection and analysis of incoming data packets.

2. The system of claim 1, wherein the processor circuitry is further configured for inline analysis of the first data packets (i) prior to processing the first data packet through an NIC security pipeline, (ii) after processing the first data packet through the NIC security pipeline, or both.

3. The system of claim 1, further comprising an encryption engine to encrypt the first data packet before the first data packet is directed to the first data packet destination.

4. The system of claim 1, wherein the encryption irregularity comprises encryption with an expired encryption, an unknown encryption algorithm or an incorrect encryption protocol.

5. The system of claim 1, wherein the instructions further cause the processor circuitry to detect packet encryption contrary to a network rule.

6. The system of claim 1, wherein the instructions further cause the processor circuitry to analyze a second packet of the plurality of data packets to detect an encryption irregularity.

7. The system of claim 1, wherein the processor circuitry and the memory circuitry are integrated on a System-on-Chip (SoC).

8. The system of claim 1, wherein the instructions further cause the processor circuitry to report the detected packet irregularity to a report server.

9. The system of claim 1, wherein the system is configured for decryption analysis and detection of incoming data packets.

10. A non-transitory computer-readable medium comprising a processor circuitry and a memory circuitry in communication with the processor circuitry and including instructions to detect and analyze decrypted data traffic through a network, the memory circuitry further comprising instructions to cause the processor to:
    analyze a first data packet of a plurality of received data packets to detect presence of an encryption irregularity, the encryption irregularity includes an indication that the first data packet was encrypted by the host platform and not a network interface card (NIC) performing the analysis; and determine, based on the analysis, whether to one of (i) discard the first data packet, (ii) direct the first data packet to a first data packet destination, or (iii) return the first data packet to a first data packet transmitter;

wherein the processor is employed at a network endpoint and wherein detection and analysis are implemented at line speed and the encryption irregularity is detected while the packet traverses through NIC and the NIC is to analyze data packets to provide firewall functionality before encrypting the data packets for transmission, wherein the instructions further cause the processor circuitry to implement inline analysis of the plurality of data packets.

11. The medium of claim 10, wherein the instructions further cause the processor circuitry to implement inline analysis of the plurality of data packets (i) prior to processing the first data packet through an NIC security pipeline, (ii) after processing the first data packet through the NIC security pipeline, or both.

12. The medium of claim 10, further comprising an encryption engine to encrypt the first data packet before the first data packet is directed to the first data packet destination.

13. The medium of claim 10, wherein the encryption irregularity comprises encryption with an expired encryption, an unknown encryption algorithm or an incorrect encryption protocol.

14. The medium of claim 10, wherein the instructions further cause the processor circuitry to detect packet encryption contrary to a network rule.

15. The medium of claim 10, wherein the instructions further cause the processor circuitry to analyze a second packet of the plurality of received data packets to detect an encryption irregularity.

16. The medium of claim 10, wherein the instructions further cause the processor circuitry to report the detected packet irregularity to a report server.

17. A network adaptor, comprising:
an Inline Security Engine (ISE) having a processor circuitry and a memory circuitry, the memory circuitry in communication with the processor circuitry, the memory circuitry configured with instructions to cause the processor circuitry to:
analyze a first data packet of a plurality of received data packets to detect presence of an encryption irregularity, the encryption irregularity includes an indication that the first data packet was encrypted by the host platform and not a network interface card (NIC) performing the analysis; and
determine, based on the analysis, whether to one of (i) discard the first data packet, (ii) direct the first data packet to a first data packet destination, or (iii) return the first data packet to a first data packet transmitter; and a cryptographic accelerator engine to receive the ISE output and encrypt the first data packet prior to transmission to the first data packet destination; and a receiver circuit to receive encrypted inbound data packets and a decryption engine to decrypt the inbound data packets;

wherein the ISE is employed at a network endpoint and wherein detection and analysis are implemented at line speed and the encryption irregularity is detected while the packet traverses through NIC and the NIC is to analyze data packets to provide firewall functionality before encrypting the data packets for transmission.

18. The network adaptor of claim 17, further comprising a receiver circuit to receive encrypted inbound data packets and a decryption engine to decrypt the inbound data packets.

19. The network adaptor of claim 17, further comprising a transmitter to transmit the first encrypted packet to the first data packet destination.

20. The network adaptor of claim 17, wherein the ISE implements inline analysis of the plurality of data packets.

21. The network adaptor of claim 17, wherein the ISE implements inline analysis of the first data packets (i) prior to processing the first data packet through an NIC security pipeline, (ii) after processing the first data packet through the NIC security pipeline, or both.

22. The network adaptor of claim 17, further comprising an encryption engine to encrypt the first data packet before the first data packet is directed to the first data packet destination.

23. The network adapter of claim 17, wherein the encryption irregularity comprises encryption with an expired encryption, an unknown encryption algorithm or an incorrect encryption protocol.

24. The network adapter of claim 17, wherein the ISE detects packet encryption contrary to a network rule.

25. The network adaptor of claim 17, wherein the ISE reports the detected packet irregularity to a report server.

* * * * *